United States Patent [19]

Fosner et al.

[11] 4,176,470

[45] Dec. 4, 1979

[54] EDUCATIONAL REINFORCEMENT APPARATUS

[75] Inventors: Emerson O. Fosner, 1118 NE. 185th, Seattle, Wash. 98155; Vernon L. Post, Kent, Wash.

[73] Assignee: Emerson O. Fosner, Seattle, Wash.

[21] Appl. No.: 829,933

[22] Filed: Sep. 1, 1977

[51] Int. Cl.² ............................ G09B 1/06; G09B 5/06
[52] U.S. Cl. ..................................... 35/22 A; 35/9 B; 35/9 D
[58] Field of Search ............... 35/8 R, 8 A, 9 R, 9 A, 35/9 D, 13, 22 R, 22 A, 35 H, 60, 19 A, 48 R

[56] References Cited

U.S. PATENT DOCUMENTS

| | | | |
|---|---|---|---|
| 1,173,298 | 2/1916 | Montessori | 35/72 |
| 1,624,450 | 4/1927 | Vershbinsky | 35/9 R X |
| 2,971,275 | 2/1961 | Provenzano | 35/9 R X |
| 3,008,246 | 11/1961 | Stall | 35/9 D X |
| 3,363,902 | 1/1968 | Jones | 35/9 R |
| 3,386,010 | 5/1968 | Nojiri | 35/19 A |
| 3,479,751 | 11/1969 | Wellbourn | 35/29 R |
| 3,535,796 | 10/1970 | Dean | 35/9 R |
| 3,546,791 | 12/1970 | Koos et al. | 35/9 B |
| 3,640,002 | 2/1972 | Braillard et al. | 35/8 R |
| 3,646,592 | 2/1972 | Bosley et al. | 35/9 D |
| 3,727,740 | 4/1973 | Evans et al. | 35/22 R |
| 3,745,673 | 7/1973 | Jimerson | 35/9 A |
| 3,760,511 | 9/1973 | Matsumoto | 35/22 A |
| 3,789,522 | 2/1974 | Moore | 35/60 |
| 3,818,609 | 6/1974 | Woolman | 35/60 X |
| 3,981,087 | 9/1976 | Sachs | 35/9 A |
| 3,986,278 | 10/1976 | Valentine | 35/13 |
| 3,996,671 | 12/1976 | Foster | 35/8 A |

FOREIGN PATENT DOCUMENTS 1417571 10/1965 France .................................. 35/9 D

*Primary Examiner*—Vance Y. Hum
*Attorney, Agent, or Firm*—Christensen, O'Connor, Johnson & Kindness

[57] ABSTRACT

An educational apparatus for automatically instructing a student to perform selected tasks, monitoring the student's action to determine if the tasks are performed in accordance with the instructions and providing audio, visual or physical reinforcement rewards upon the successful completion of the tasks is disclosed. The educational apparatus includes a carrel or booth having a horizontal work surface within which a plurality of holes are formed. In one embodiment, coded pegs having visual or tactile symbols located on one end and a machine readable code, peripherally located, near the other end are provided for insertion into the holes. In this embodiment sensing arrangements mounted in the peg holes read the machine readable code and control electrical signals in accordance therewith. The resultant information denotes the nature and orientation of inserted pegs. A CPU, programmed when peg insertion instructions are given, compares the peg orientation information with the program information. The comparison determines whether or not the peg insertion instructions have been followed. When all instructions have been correctly carried out, the CPU causes a designated reinforcement reward to be produced and the pegs to be ejected. In alternate embodiments, the holes are of different size or shape and objects are either inserted into the holes, or drop through the holes. In these embodiments the insertion or passage of the objects is sensed and the sensed information applied to the CPU for comparison with the program instructions. In all embodiments, failure to complete a selected number of tasks within a predetermined period of time causes an instructor alert indication to be produced.

5 Claims, 8 Drawing Figures

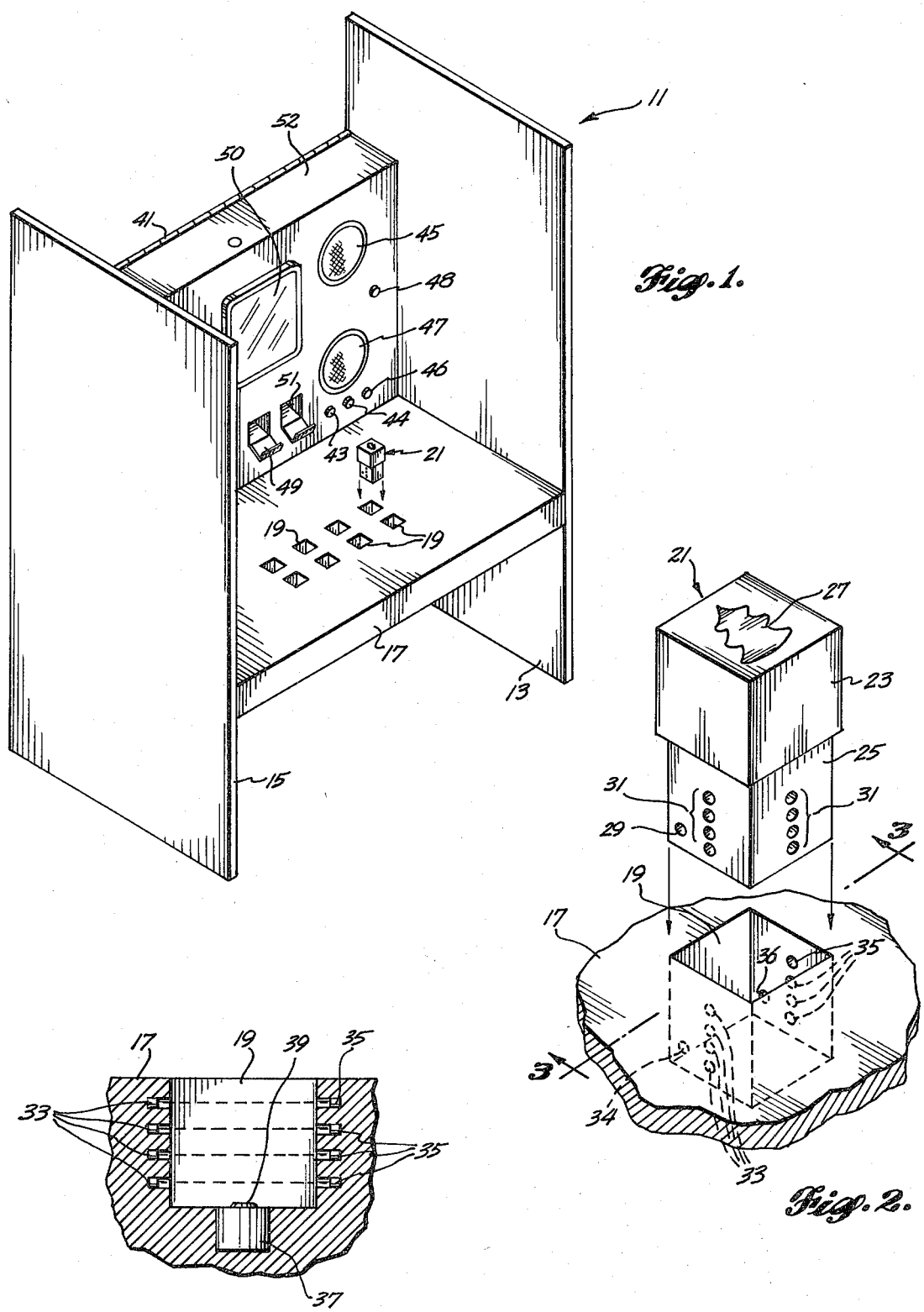

EDUCATIONAL REINFORCEMENT APPARATUS

BACKGROUND OF THE INVENTION

This invention is directed to educational apparatus and, more particularly, to programmable educational apparatus.

Various types of educational apparatus and devices have been proposed for use by students. Such apparatus varies from simple mechanical arrangements to sophisticated electromechanical apparatus. In simple arrangements, often, a box or housing includes a plurality of apertures adapted to receive blocks of different geometric configurations, one block being associated with each aperture. Sophisticated electromechanical apparatus, on the other hand, often use cathode ray tube displays, and the like, connected to program sources that automatically display questions of a relatively complicated nature; and request the student to select the correct answer from a number of answers; or indicate whether a statement is true or false. Thus, in the past, educational apparatus has, on the one hand, been relatively uncomplicated and, on the other hand, been relatively sophisticated. The uncomplicated apparatus has generally required continuous instructor supervision, particularly when utilized by relatively young children or persons with low mental capacity. The more sophisticated devices have been designed to require minimal instructor supervision; however they usually require relatively high levels of mental capability—at least the ability to read words or numbers, or the ability to understand detailed questions. To date, there have been few proposals for devices that integrate the programmability of the relatively sophisticated systems with the uncomplicated nature of the less sophisticated arrangements in order to provide educational apparatus that has the capability of educating persons of low mental capability, without requiring continuous supervision by an instructor.

In addition, in the past, in general, education devices have had very limited ability to automatically reward a student upon the successful completion of a task and, thereby, encourage the student to tackle the next task. In most cases, the reward has been a simple visual reward indicating the successful solution of a problem or completion of a task. For example, the word "correct" may flash on a screen or a light may be lit if the correct answer is given. In many instances, particularly when retarded persons are being educated, a visual reward is inadequate to encourage the student to tackle the next problem. Such persons normally require a more concrete reward, i.e., food or drink.

Therefore, it is an object of this invention to provide new and improved educational apparatus.

It is a further object of this invention to provide educational apparatus that is programmable and particularily suitable for use in instructing students how to perform relatively uncomplicated tasks.

It is another object of this invention to provide an educational reinforcement apparatus that can be programmed to reward a student in a variety of ways upon the successful completion of one or more tasks.

It a still further object of this invention to provide a relatively uncomplicated and, therefore, inexpensive educational reinforcement apparatus that is programmable and, thus, suitable for widespread use, particularly by persons of low mental capability.

SUMMARY OF THE INVENTION

In accordance with this invention, an educational reinforcement apparatus for instructing a student to perform certain tasks, monitoring the student's actions to determine if the tasks are performed in accordance with the instructions and providing reinforcement rewards upon the successful completion of the tasks is provided. The educational apparatus includes a carrel or booth having a work surface upon which the tasks are to be performed. In its preferred form, the tasks require the insertion of items, such as pegs or objects of different sizes or shapes, in designated holes formed in the work surface. A controller, such as a central processing unit (CPU), controls a suitable audio or audio/visual instruction source, such as a tape recorder. At the same time instructions are given, the instruction source applies control instructions to the CPU. The control instructions denote, in machine readable form, the instructions given to the student. In accordance with the audio instructions, the student inserts the pegs or other items into the designated holes. The insertion of the items is detected and compared by the CPU with the control instructions. When the tasks are successfully completed, the CPU causes a designated reward to be produced. The rewards may take the form of visual rewards, audio rewards, or physical rewards, e.g., foods or liquids. In addition, audio or visual reprimands denoting the unsuccessful completion of the tasks may be produced, under the control of the CPU.

In the peg insertion of the invention, each peg includes tactile or visual symbols located on one end. Located along the longitudinal length of the pegs are machine readable codes. Located in the peg holes are sensors adapted to read the machine readable codes. The CPU compares the codes of inserted pegs with the control instructions and, in accordance therewith, controls the production of rewards. Preferably, the pegs are square in cross-sectional configuration and the machine readable codes comprise a plurality of apertures passing orthogonally through the pegs, such that the presence or absence of apertures identifies, in a binary manner, the nature of each peg. That is, the identifying apertures (binary codes) denote in machine readable form the nature of the peg's visual or tactile symbol. In addition, an orientation aperture is located in each leg. Preferably, the identifying apertures are centrally located and the orientation aperture is offset from the identifying apertures. Also preferably similar sets of identifying apertures pass through both sets of opposing faces of the legs and the orientation aperture passes through only one set of faces. The sensors are preferably electro-optical and, for each potential aperture location, comprise a suitable light source, such as a light emitting diode, aligned with a suitable light receiving device, such as a phototransistor. When a peg is suitably positioned in a peg hole, the orientation aperture is positioned such that light produced by a light emitter passes through the orientation aperture and is received by a light detector. Misalignment of a peg, or the failure to insert a peg fully, prevents the light produced by the light emitters from being received by the light detectors. The identification apertures are also alignable between a plurality of light emitter-detector combinations. These combinations determine the nature of the peg inserted into the hole by determining whether or not an identification aperture is present or absent at a particular location. If present, light emitted by a light emitter passes through an orientation aperture and is received by a light detector. If absent, emitted light is not received. In this manner, orientation and identification information is provided.

In addition, preferably, located at the bottom of each of the peg holes is an eject solenoid. The eject solenoids are actuated by the CPU prior to the start of task sequence. Also, preferably, the CPU includes presettable timers. One presettable timer is connected to an instructor's alert light such that the alert light is lit if the student does not complete a designated number of tasks within prescribed time periods, determined by the setting of the presettable timer. Another presettable timer controls the reward consumption time, if the reward is food or liquid.

In the different size or shape object forms of the invention, each hole is selectively sized or shaped, as the case may be. Objects of corresponding size or shaped are provided for insertion into the holes. The objects may be allowed to pass through the holes and be returned to a suitable location by an inclined receiving ramp or conveyor, for examples. In any event, the insertion of an object into, or passage through, a hole is detected by a suitable sensor. The sensor may be an electro-optical sensor position such that its light beam transverses the hole. When an object is inserted into a hole it breaks the beam and causes a pulse or signal level change to be applied to the CPU. The CPU compares the received pulse with the program instructions to determine if the object was inserted in accordance with the instructions.

It will be appreciated from the foregoing brief summary that the invention provides an educational reinforcement apparatus suitable for use by relatively uneducated individuals, e.g., children or individuals with low mental abilities. The invention is particularly suitable for instructing retarded students in the performance of relatively uncomplicated tasks, i.e., the insertion of designated pegs into designated holes. While generally intended to be used in an uncomplicated manner, the invention can be made somewhat sophisticated by making the tactile or visual symbols relatively complicated. The invention can be also utilized in a sophisticated way by, for example, requiring that the pegs be inserted in the holes in a particular sequence in order for a task to be successively completed. Hence, the invention can be formed and used in a relatively uncomplicated manner or formed and used in a relatively sophisticated manner, depending upon the requirements of a particular educational situation.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a pictorial diagram of an educational carrel or booth forming a part of a peg insertion embodiment of the present invention;

FIG. 2 is a partial, pictorial diagram illustrating a peg and a peg hole formed in accordance with the invention;

FIG. 3 is a cross-sectional view of a peg hole, taken along line 3—3 of FIG. 2, illustrating an optical system for detecting the presence and orientation of a peg positioned in the hole, and an ejection solenoid for ejecting pegs from the hole;

DESCRIPTION OF THE PREFERRED EMBODIMENT

Figure 4:
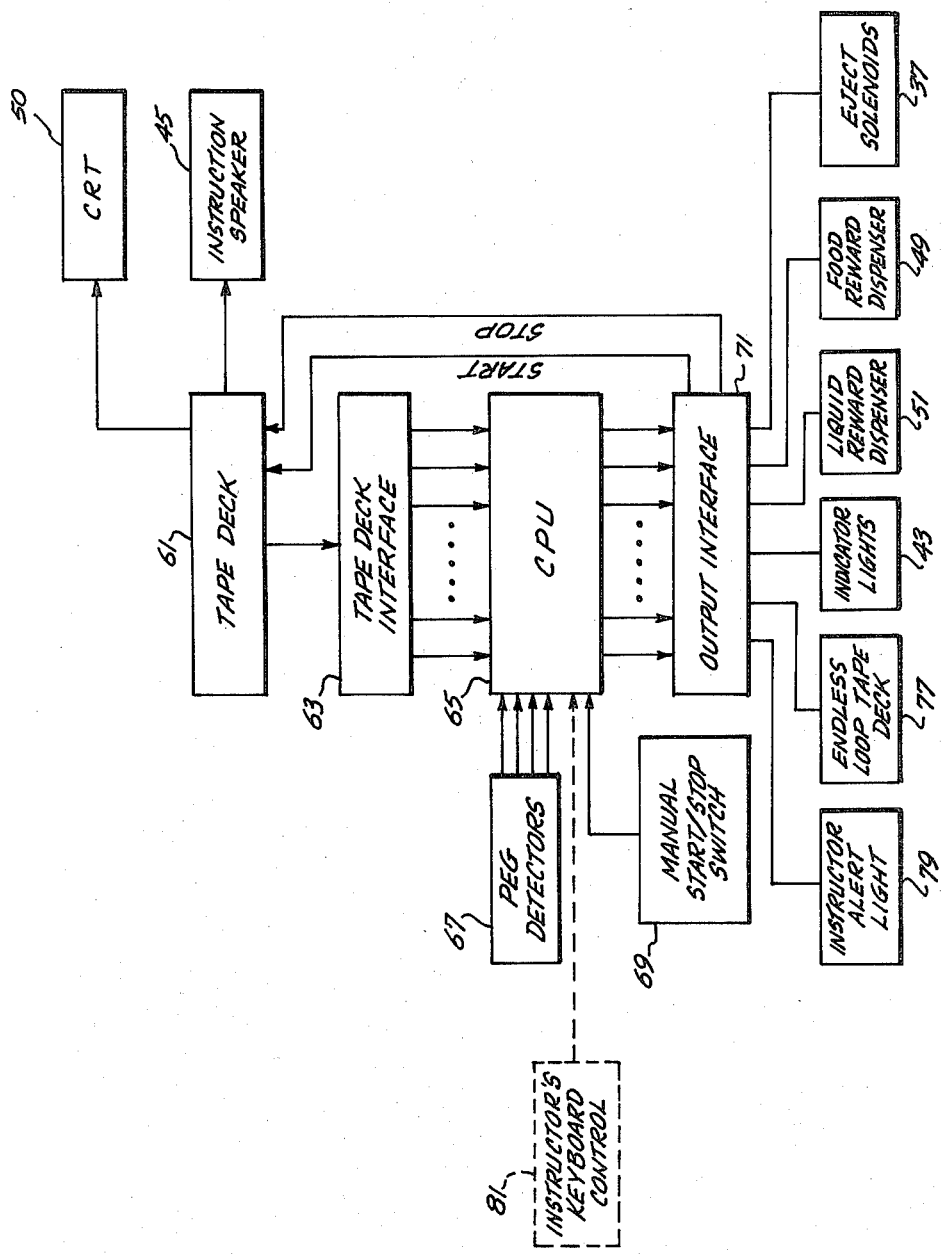
FIG. 4 is a block diagram of a CPU type electromechanical control system formed in accordance with the invention for controlling the embodiment of the invention illustrated in FIGS. 1–3.

FIG. 1 illustrated a carrel or booth 11 of a peg insertion embodiment of the invention that comprises: a pair of vertical, parallel sidewalls 13 and 15; and, a horizontal work surface 17 mounted between the sidewalls. Formed in the top of the work surface 17 are eight peg holes 19, located in a two-by-four array. Each peg hole 19 is square in cross section, and adapted to receive a peg 21.

As illustrated in FIG. 2, each peg 21 is elongate and includes an enlarged end 23 and a small end 25. Both the enlarged end and the small end are square in cross section, with the width of the sides of the enlarged end being longer than the width of the sides of the small end. The width of the sides of the small end are equal to the width of the sides of the square peg holes 19; and the length of the sides of the small end are equal to the depth of the peg holes. Thus, the small end of the pegs fit into, and entirely fill, the peg holes.

Located on the outer tip of the enlarged end 23 of each peg is a different tactile or visual symbol 27. That is, this embodiment of the invention contemplates the use of a number of pegs, each of which has a different tactile or visual symbol located on the outer tip of the enlarged end. The small end 25 includes an orientation aperture 29 and a plurality of identification apertures 31. The identification apertures are a series of parallel holes that are aligned with, and pass orthogonally through, the central longitudinal axis of the peg. There are two similar sets of centrally located identification apertures, each of which defines a row. One set of apertures passes through one pair of opposing sides of the small end of the peg and the other passes through the other pair of opposing sides. Thus, the code defined by the identification apertures can be read in the manner hereinafter described regardless of how a peg is oriented in a peg hole, as long as the peg is fully inserted. The orientation aperture 29 is a hole that is offset from one set of identification apertures and only extends between one set of opposing sides of the small end of the peg. Thus, for light to pass through the orientation aperture, as hereinafter described, the peg must be correctly oriented in a peg hole. Contrariwise, light will pass through the identification apertures regardless of peg orientation, if a peg is fully inserted into a hole because of the central location of the orientation apertures and the duplicate rows.

FIG. 3 is a cross-sectional view through a peg hole 19 formed in the work surface 17. The plane of the cross-sectional view is central, as illustrated in FIG. 2. Located in one wall of the peg hole is a row of light emitters (e.g., lamps) that may be formed by light emitting diodes (LEDs) 33. Located in the opposite wall of the peg hole 19 from the LEDs 33 are a row of light detecting devices 35 that may take the form of phototransistors. The light emitters/light detectors are paired and aligned on a one-to-one basis. The pairs are aligned such that when no peg is located in the hole, light from the light emitters impinge on corresponding light detectors. The position of the light emitters/light detectors is such that when a peg is fully inserted in the hole, the identification apertures 31 allow light to flow from an associated light emitter 33 to a related light detector. It is the presence or absence of identification apertures, as determined by the receipt of light by the light detectors 35, that identifies the pegs. More specifically, assuming the maximum number of identification apertures is four (4), the specific number of apertures (e.g., 1, 2, 3 or 4) actually contained in a peg, and their position, uniquely identifies, in a binary manner, the nature of the symbol on a particular peg.

A similar light emitter/light detector arrangement is provided to determine when a peg is correctly oriented. In this regard, as seen in FIG. 2, a light emitter 34 is located in the same wall as the light emitters used to determine peg identification. Aligned with the orientation light emitter 34, in the opposite wall of the peg hole 19, is an orientation light detector 36. When a peg is correctly oriented, light from the orientation light emitter passes through the orientation aperture 29 and is received by the orientation light detector. As a result, not only is the binary code for the block related to the tactile or visual symbol 27 determinable, the orientation of the peg is also determinable. Located at the bottom of the peg hole 19 is an ejection solenoid 37. The ejection solenoid includes a slug 39 that rises upwardly when the ejection solenoid 37 is energized so as to eject a peg in the related peg hole. As will be better understood from the following discussion, the ejection solenoids are adapted to eject pegs from peg holes when the ejection solenoids are energized prior to an instruction/task performance sequence.

Located atop the work surface 17 near the rear edge thereof is an electromechanical control unit housing 41. The electromechanical control unit housing 41 houses an electromechanical control unit of the type generally illustrated in FIG. 4 and hereinafter described. The front face of the electromechanical control unit housing 41 supports one or more indicator lights 43, a start light 44 and a stop light 46. Also located on the front face of the electromechanical control unit housing 41 is an instruction speaker 45, a reward/reprimand speaker 47, an earphone jack 48 and a cathode ray tube (CRT) screen 50. Finally, food and liquid reward dispensers 49 and 51 are located on the front face of the electromechanical unit housing 41. Preferably, the top 52 (or back) of the electromechanical control unit housing 41 is hinged so that it can be opened to allow access to the interior of the electromechanical control unit housing 41. Access is provided so that the internal workings of the electromechanical control unit can be adjusted or repaired, as necessary. In addition, access to the interior of the electromechanical unit housing 41 allows an instruction media, such as an audio or video tape cassette, to be inserted or changed, as necessary, and as will be better understood from the following discussion.

An electromechanical control unit formed in accordance with the invention is illustrated in FIG. 4 and comprises: a tape deck 61; a tape deck interface 63; a central processing unit (CPU) 65; a series of peg detectors 67 (formed by the phototransistors 35); a manual start/stop switch 69; an output interface 71; the eject solenoids 37; the food reward dispenser 49; the liquid reward dispenser 51; the indicator lights 43; an endless loop tape deck 77; and, an instructor's alert light 79.

The tape deck 61 is connected to the instruction speaker 45, to the CRT (if used) and to the tape deck interface. When actuated, in the manner hereinafter described, the tape deck produces audio or audio and visual instructions that are broadcast by the instruction speaker 45 and displayed on the CRT. At the same time, the tape deck produces digital logic control signals that are applied to, and control, the CPU. In this regard, the tape deck interface is connected to the CPU. The tape deck interface conditions the control signals produced by the tape deck and places them in a form suitable for receipt by the CPU. The tape deck interface may for example, convert serial control instructions, produced by the tape, into parallel control instructions.

The peg detectors 67 and the manual start/stop switch are also connected to the CPU. The CPU is connected to the output interface. The output interface receives control signals produced by the CPU and conditions them for receipt by other subsystems. In this regard, tape deck start and stop signals produced by the CPU are conditioned by the output interface 71 and applied to the tape deck 61. In addition, the CPU produces, and the output interface conditions, control signals that are applied to the instructor alert light 79, the endless loop tape deck 77, the indicator lights 43, the liquid reward dispenser 51, the food reward dispenser 49 and the eject solenoids 37.

The tape deck 61 may be formed by an audio or audio/visual (if CRT instructions or to be given) reel-to-reel tape deck, a cassette tape deck or a cartridge tape deck. Alternatively, the tape deck 61 may take the form of some other type of device for converting stored information into audio or audio/visual signals and control signals. In any event, a suitable data storage media, e.g., magnetic tape, is inserted into the tape deck 61 so as to be read thereby. Thereafter, when the manual start/stop switch 69 is actuated, the CPU produces a start signal that causes the tape deck to start reading audio or audio/visual and control signals. As the tape moves through the tape deck, the audio or audio/visual signals produced cause the instruction speaker 45 to utter instructions, and, if made operative, the CRT to illustrate the instructions. The control signals, at the same time, are applied, via the tape deck interface, to the CPU 65, wherein they are stored. When a complete set of instructions have been uttered (and displayed), and the related control signals stored, the CPU produces a stop signal that, via the output interface, causes the tape deck to stop. The system is now conditioned for the student to follow the audio or audio/visual instructions. More specifically, the student has now been verbally (and visually) instructed with respect to placing pegs in peg holes. In addition, the control signals have conditioned the CPU so that it can determine when the instructions have been correctly carried out, i.e., determine when the correct pegs have been inserted into the correct holes. Further, the control signals have conditioned the CPU such that the correct reward will be produced if the instructions are satisfactorily carried out.

As the student places pegs in the peg holes in accordance with the instructions, as previously described, the peg detectors 67 detect the presence and orientation of the pegs. The CPU compares the peg insertion information with the control signal information and, in accordance therewith, controls the various outputs via the output interface. As noted above, if all (or a predetermined percentage) of the instructions are followed correctly, the CPU causes a suitable reward to be produced. The reward may take the form of a visual reward (e.g., "correct answer" light lit), an audio reward, (e.g., verbal "good job" uttered by actuating the endless loop tape deck which is connected to the reward/reprimand speaker 47), a liquid reward (e.g., soft drink) or a food reward (e.g., candy bar) to be produced. At the same time, or prior to the next instruction sequence, the eject solenoids 37 are energized and the pegs ejected. After the reward is given and the pegs ejected, the CPU automatically causes the tape deck to start, whereby the next set of verbal (and visual) instructions are uttered, and the next set of control signals are applied to the CPU. Alternatively, the system may be designed such that the manual start/stop switch 69 must be actuated before the next set of instructions and control signals are produced. If the student does not complete the instructions within a preset time period, the CPU, via the output interface, causes the instructor's alert light 79 to be lit. This light is remotely located at an instructor's desk and advises the instructor that the student needs assistance. Because an instructor is not required to continously monitor each student's work, one instructor can supervise a large number of students at the same time.

Figure 5:
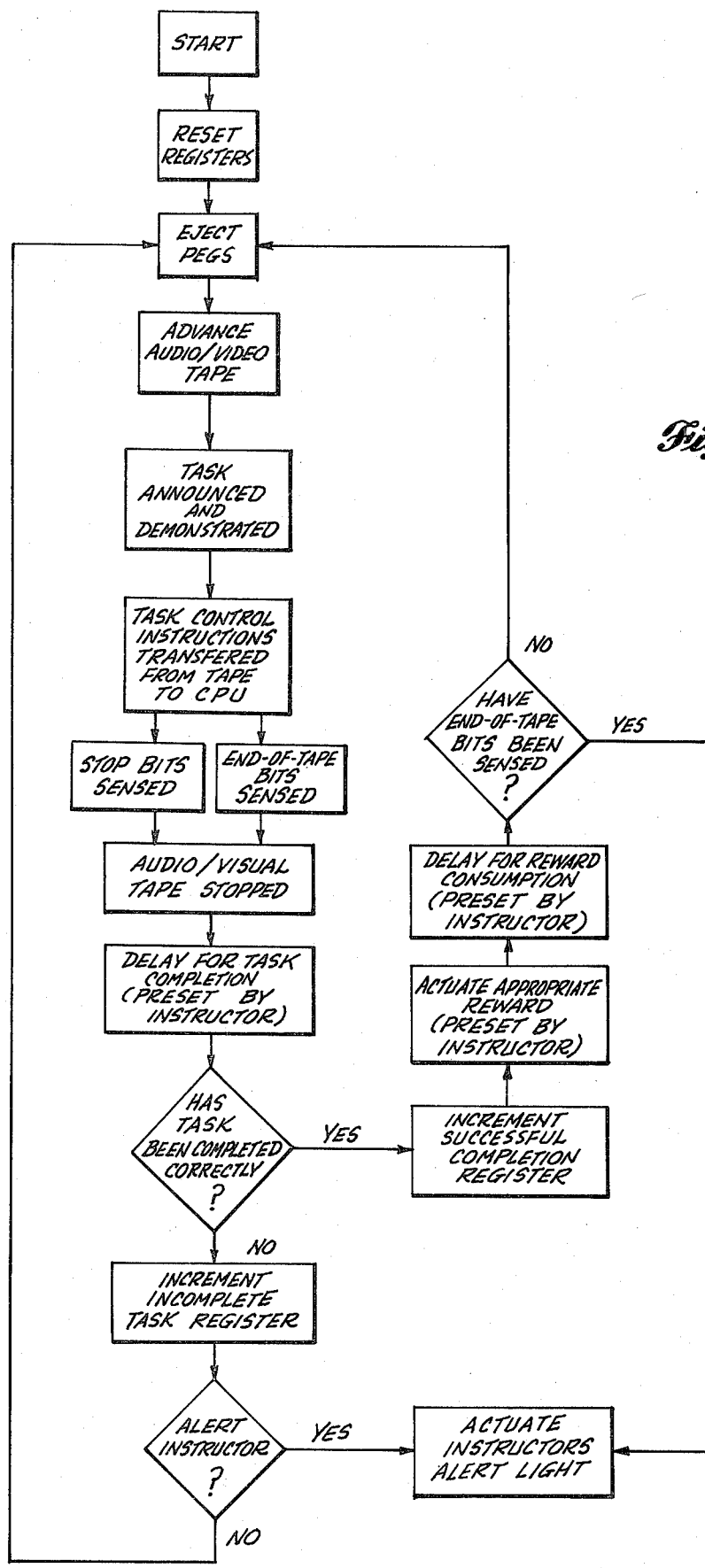
FIG. 5 is a flow diagram illustrating the operatin of the CPU control system illustrated in FIG. 4.

FIG. 5 is a flow diagram illustrating in more detail the operation of the CPU, which may take on various forms. For example, the CPU may be a hard-wired system comprising a series of storage registers, and logic for performing the comparing and reward control functions previously discussed. Alternatively, the CPU may take the form of a large scale integrated (LSI) circuit or a small minicomputer. In any event, the operation of the CPU is initiated when actuation of the start/stop switch causes a start signal to be produced. The start signal causes the registers of the CPU to be reset to zero. After the registers are reset, the peg ejection solenoids are energized to eject any inserted pegs. The audio or audio/visual tape is now advanced. As the instructions are given, as noted above, task control instructions are simultaneously transferred from the tape to the CPU. This action continues until either a set of stop bits or end-of-tape bits are sensed. When either types of bits are sensed the audio or audio/visual tape is stopped. The system now idles while the student works to complete the task or tasks in accordance with the instructions. The idle time can be set by tape instructions or it can be inserted by the instructor via an instructor's key board control s1 connected to the CPU, as illustrated in FIG. 4.

After the predetermined idle period of time has elapsed, the CPU interrogates a series of comparators that compare information about the correct insertion of the pegs as indicated by the related control signals stored in the CPU with the information produced by the peg detectors 67. If the instructions have not been completed correctly within the prescribed period of time, an incomplete task register is incremented. Next a decision is made to alert the instructor. The decision is based on the state of the incomplete task register. The instructor may be alerted upon the first task failure, or only after an arbitrary number of tasks (e.g., 10) have not been completed. If the instructor is not to be alerted, the pegs are ejected and the tape advanced to the next set of instructions.

If the instructions are completed correctly during the idle period of time, a successful completion register is incremented, followed by the appropriate reward being dispensed. The nature of the reward may be controlled by tape reward bits or by instructions produced by the instructor's keyboard control 81. After the reward is dispensed, time is allowed for it to be consumed. The consumption time may be set by tape bits or by instructions produced by the instructor's keyboard control. At the end of the consumption time period either the pegs are ejected and the tape advanced or, if the end-of-tape bits have been previously sensed, the instructor's alert light is actuated.

It should be noted that while the eight square peg holes are illustrated as arranged in a pattern that makes each hole identifiable by oral command, the peg holes can also be identified by overlays which include designs or pictures surrounding the holes such that each hole is uniquely identifiable. Moreover, the number of pegs need not necessarily be limited to eight. For example, 16 pegs can be utilized, if desired. And, of course, the number of peg holes can be increased or decreased from the eight shown. As a result, using the various permutations and combinations, tasks numbering in the billions can be created using only eight holes and sixteen pegs.

Figure 6:
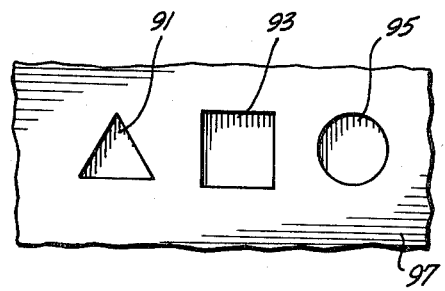
FIG. 6 is a diagram illustrating holes of different shape.
Figure 7:
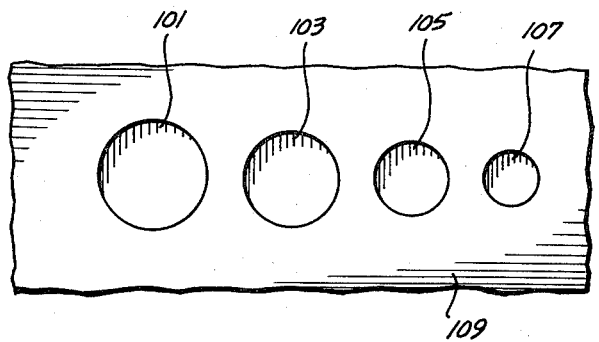
FIG. 7 is a diagram illustrating holes of the same shape, but different in size; and, FIG. 8 is a cross-sectional diagram of a ramp mechanism for returning objects, such as different sized balls, to a receiving tray.
Figure 8:
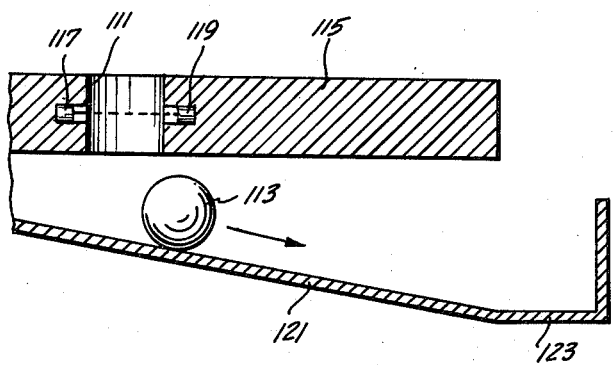

FIGS. 6, 7 and 8 are directed to embodiments of the invention that are less complicated than a peg insertion embodiment. Specifically, FIG. 6 is directed to an embodiment wherein each of the holes has a different shape. By way of example, a triangular hole 91, a square hole 93 and a circular hole 95 are illustrated in FIG. 6 as formed in a work surface 97. Obviously, other shaped holes can be utilized.

FIG. 7 is directed to an embodiment of the invention wherein each hole has the same shape but is of a different size. By way of example, FIG. 7 illustrates four different sized circular holes 101, 103, 105 and 107 formed in a work surface 109. Obviously, other sized holes can be utilized, as well as other shapes. And, of course, the number of holes can be greater or lesser than four. Moreover, the concepts illustrated in FIGS. 6 and 7 can be combined, i.e., a series of shaped apertures some shapes being different and others being the same but different in size can be used in an embodiment of the invention.

The embodiments of the invention whose apertures are depicted in FIGS. 6 and 7 are less complicated than the heretofor described peg embodiment because only the insertion of an object in a hole, or the passage of an object through a hole is detected. The nature of the inserted or passing object is not detected by reading a code. In this regard, attention is directed to FIG. 8. FIG. 8 illustrates a cylindrical hole 111 sized so as to pass a ball 113 of equal diameter. Located in the work surface 115 on one side of the hole is a light emitting element 117 and located on the opposing side of the hole is a light detecting element 119. Each time a ball 113 passes through the hole 115 the light beam directed by the light emitting element 117 toward the light detecting element 119 is broken and a pulse is produced. The pulses are applied to the CPU and used to determine if the instructions have been correctly carried out, i.e., the right object has been placed in the right hole. If the instructions have been followed correctly a reward is dispensed, as previously discussed. If the instructions have not been followed correctly, the incomplete task register is incremented and, either the instructor is alerted or the tape advanced and a new set of instructions given.

FIG. 8 also illustrates an alternative feature of the invention. Specifically, FIG. 8 illustrates a ramp 121 suitable for receiving rolling objects, such as the ball 113, after they have passed through an aperture. The ramp directs the objects to a receiving tray or trough 123, from which the objects can be readily removed. If the objects are such that they do not readily roll, the ramp can be replaced by a conveyor.

It will be appreciated from the foregoing description of preferred embodiments that the invention provides educational reinforcement apparatus. That is, the invention provides educational apparatus designed to teach individuals to perform in accordance with relatively uncomplicated commands, i.e., place a particular peg or object in a particular hole. The invention is uncomplicated, yet has widespread flexibility because instructions can be given on an individual one-at-a-time basis, or several instructions can be given at the same time. Moreover, depending upon the complexity of the objects or the symbols contained in the pegs, the level of understanding needed to carry out the audio/visual instructions can vary from relatively low to relatively high.

In addition to receiving control signals from the tape deck 61, as illustrated by the dashed line in FIG. 4, the CPU can also receive control instructions produced by an instructor's keyboard control 81, as generally noted above. In this regard, the instructor's keyboard control 81 can be used to direct the CPU to modify, or expand upon, the control instructions received from the tape deck. In addition, if desired, the CPU can control the transmission of data from the incomplete task and successful completion registers to displays located on the instructor's keyboard control. In addition, the instructor's keyboard control can be used to cause the endless loop tape deck 77 to produce a reprimand signal under the instructor's control. For example, if the student fails to give a correct response, and the instructor's alerts light is lit, the instructor can cause the endless loop tape deck to produce a suitable reprimand, or if desired, a further instruction, such as "remove the last peg and replace it with the correct peg."

While a preferred embodiment of the invention has been illustrated and described, as will be appreciated by those skilled in the art and others, various changes can be made therein without departing from the spirit and scope of the invention. For example, other types of coding arrangement and sensors can be utilized if desired. In this regard, magnetic particles could be imbedded into the walls of the small end of the pegs, or the objects. The presence or absence of magnetic particles could be sensed by magnetic detectors positioned at suitable positions in the walls of the pegholes. Further, the pegholes and pegs could take on some form other than square; for example, they could be hexagonal in cross section or triangular. Hence, within the scope of the appended claims, the invention can be practiced otherwise than as specifically described herein.

The embodiments of the invention in which an exclusive property or privilege is claimed are defined as follows:

1. An educational reinforcement apparatus comprising:
   a work surface including a plurality of holes for receiving coded items;
   a plurality of coded items for insertion into said plurality of holes in said work surface;
   detecting means mounted in said work surface for detecting the presence of coded items inserted into said holes in said work surface;
   instruction and control means including a tape deck for producing audio instructions regarding the insertion of said coded items into said holes in said work surface and control signals related to the nature of said instructions, said instruction and control means also including an instruction speaker and a central processing unit, said central processing unit connected to said detecting means and including control signal storage means and comparing means, said tape deck connected to said instruction speaker and said central processing unit so as to simultaneously apply said audio instructions to said instruction speaker and said control signals to said control signal storage means, said comparing means of said central processing unit connected to said control signal storage means for comparing the detected presence of coded items inserted into said holes with the control signals stored in said control signal storage means related to the instructions given regarding the insertion of coded items into said holes in said work surface;
   reward means connected to said instruction and control means for providing a reward when said comparison means determines that coded items have been inserted in said holes in said work surface in accordance with said instructions; and,
   an eject solenoid located at the bottom of each of said holes in said work surface, said eject solenoids connected to said central processing unit such that said central processing unit causes said eject solenoids to eject coded items in said holes in accordance with a predetermined set of instructions 2. An educational reinforcement apparatus as claimed in claim 1 wherein said central processing unit includes a timer that places the central processing in an idle state for a predetermined period of time after said instructions are given, said central processing comparing said control signals with the detected presence of coded items inserted into a hole subsequent to the termination of said idle period of time.

3. An educational reinforcement apparatus as claimed in claim 2 wherein said central processing unit causes said tape to advance and a new set of instructions to be uttered subsequent to the dispensing of a reward.

4. An educational reinforcement apparatus as claimed in claim 3 wherein the next set of instructions are not given until a predetermined period of time has elapsed subsequent to a reward being dispensed.

5. An educational reinforcement apparatus as claimed in claim 4 wherein said reward means includes a liquid reward dispenser, a food reward dispenser, a visual reward dispenser and an audio reward dispenser.

* * * * *